United States Patent [19]

Klaue

[11] 3,979,973

[45] Sept. 14, 1976

[54] STARTING DEVICE FOR HEAVY VEHICLES

[76] Inventor: Hermann Klaue, 24, Tour D'Ivoire, 1820 Montreaux, Switzerland

[22] Filed: Apr. 9, 1973

[21] Appl. No.: 349,468

Related U.S. Application Data

[63] Continuation-in-part of Ser. No. 202,773, Nov. 29, 1971, abandoned.

[30] Foreign Application Priority Data

Apr. 14, 1972 Switzerland......................... 5582/72
Nov. 30, 1972 Switzerland....................... 17469/72
Dec. 8, 1970 Germany............................ 2060337

[52] U.S. Cl................................ 74/740; 74/781 R; 74/785; 74/790
[51] Int. Cl.²..................... F16H 37/00; F16H 57/10
[58] Field of Search................. 74/781 R, 790, 785, 74/789, 740; 188/264 D

[56] References Cited
UNITED STATES PATENTS

| | | | |
|---|---|---|---|
| 690,641 | 1/1902 | Davis................. | 74/781 R |
| 1,996,815 | 4/1935 | Kimpton et al.................. | 74/789 X |
| 2,120,953 | 6/1938 | Bear.................. | 74/789 X |
| 2,314,664 | 3/1943 | Shenstone........................ | 74/785 |
| 2,490,783 | 12/1949 | Cullen.................. | 74/758 X |
| 2,870,655 | 1/1959 | Rockwell.................. | 74/785 |
| 3,124,216 | 3/1964 | Buyze.................. | 188/264 D |
| 3,154,964 | 11/1964 | Lewis.................. | 74/785 X |
| 3,396,610 | 8/1968 | Rich, Jr. et al.................. | 74/785 X |

FOREIGN PATENTS OR APPLICATIONS

| | | | |
|---|---|---|---|
| 982,138 | 1951 | France............................. | 188/264 D |
| 308,961 | 1929 | United Kingdom.................. | 74/789 |

*Primary Examiner*—Samuel Scott
*Assistant Examiner*—Lance W. Chandler
*Attorney, Agent, or Firm*—Larson, Taylor and Hinds

[57] ABSTRACT

A vehicle with a transmission shiftable in steps by means of friction clutches includes starting unit at the input or output of the transmission comprising a planetary gear having several components, wherein a first of the components is driven. A braking device has at least one brake member connected with a second of the components for rotation therewith, fricton bodies for braking the brake member by dry frictional contact, and actuating means and cooling means for the friction bodies. An actuating system is provided for the transmission and the starting unit which, in a first mode of actuation, holds the brake member fixed on a stationary structural member by means of the friction bodies during automotive operation, and in a second mode of actuation, slidingly brakes the brake member when starting the vehicle. The actuating system in the first mode of actuation briefly releases the brake member from the stationary member during the shifting process so as to suppress any shock produced during shifting.

9 Claims, 12 Drawing Figures

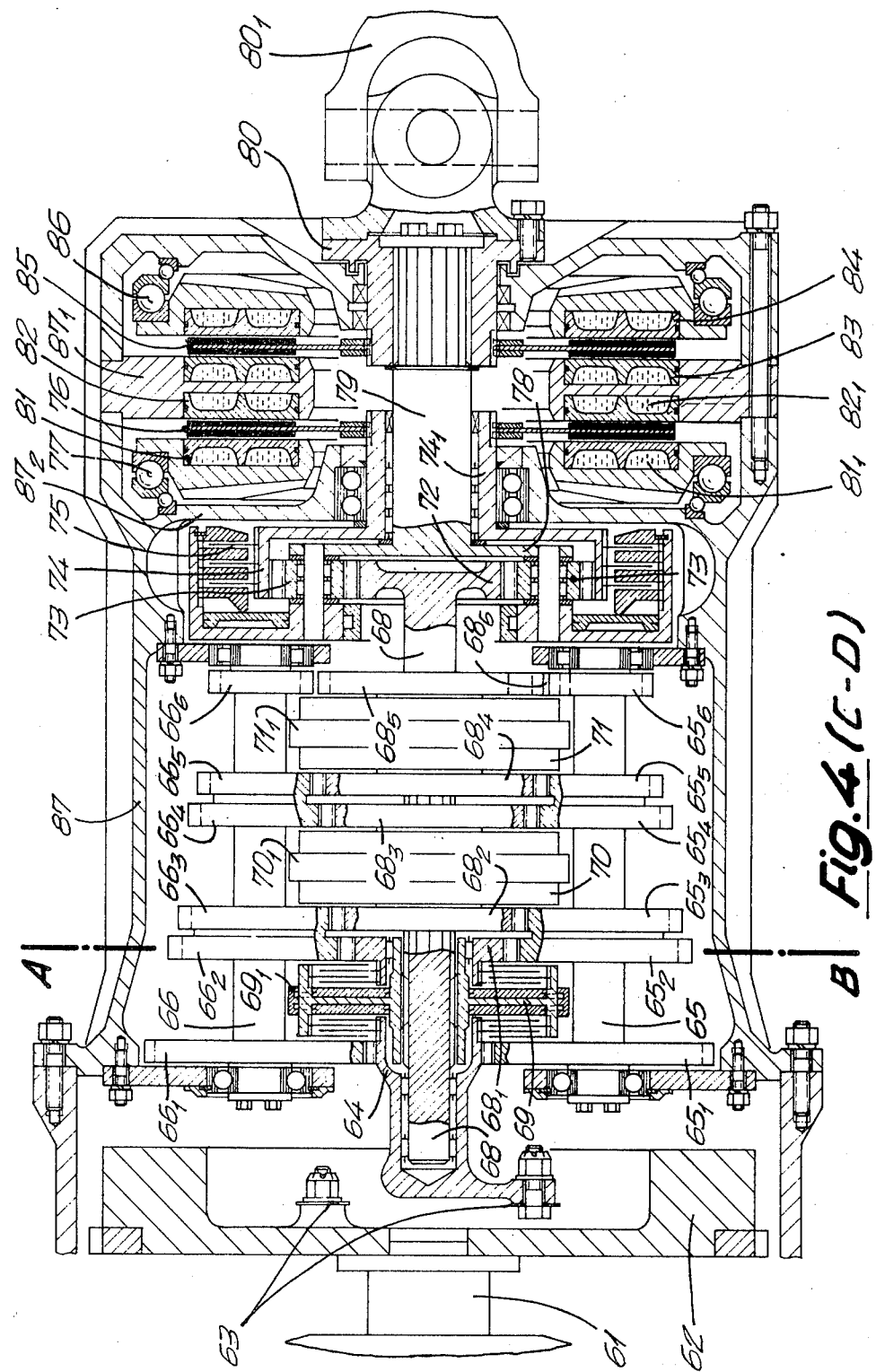
Fig.4 (C-D)

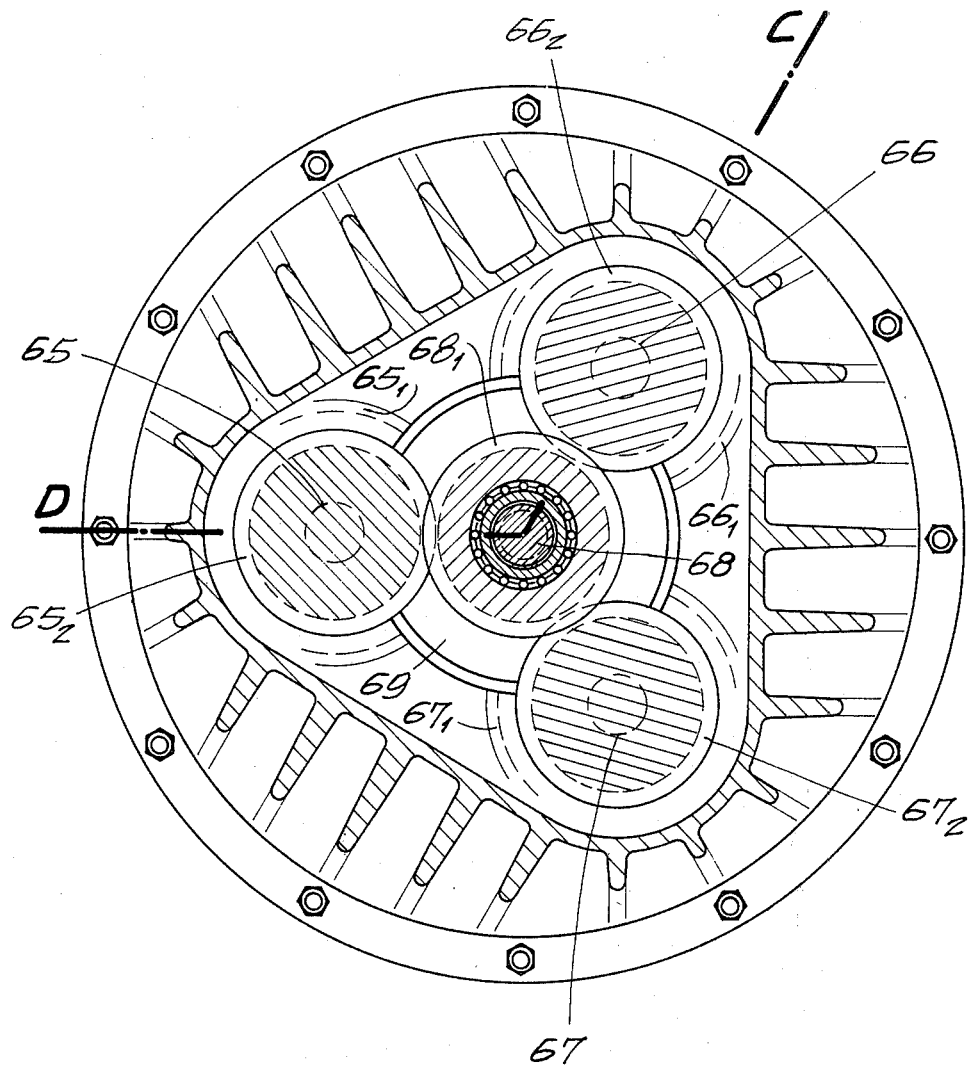
Fig. 5 (A-B)

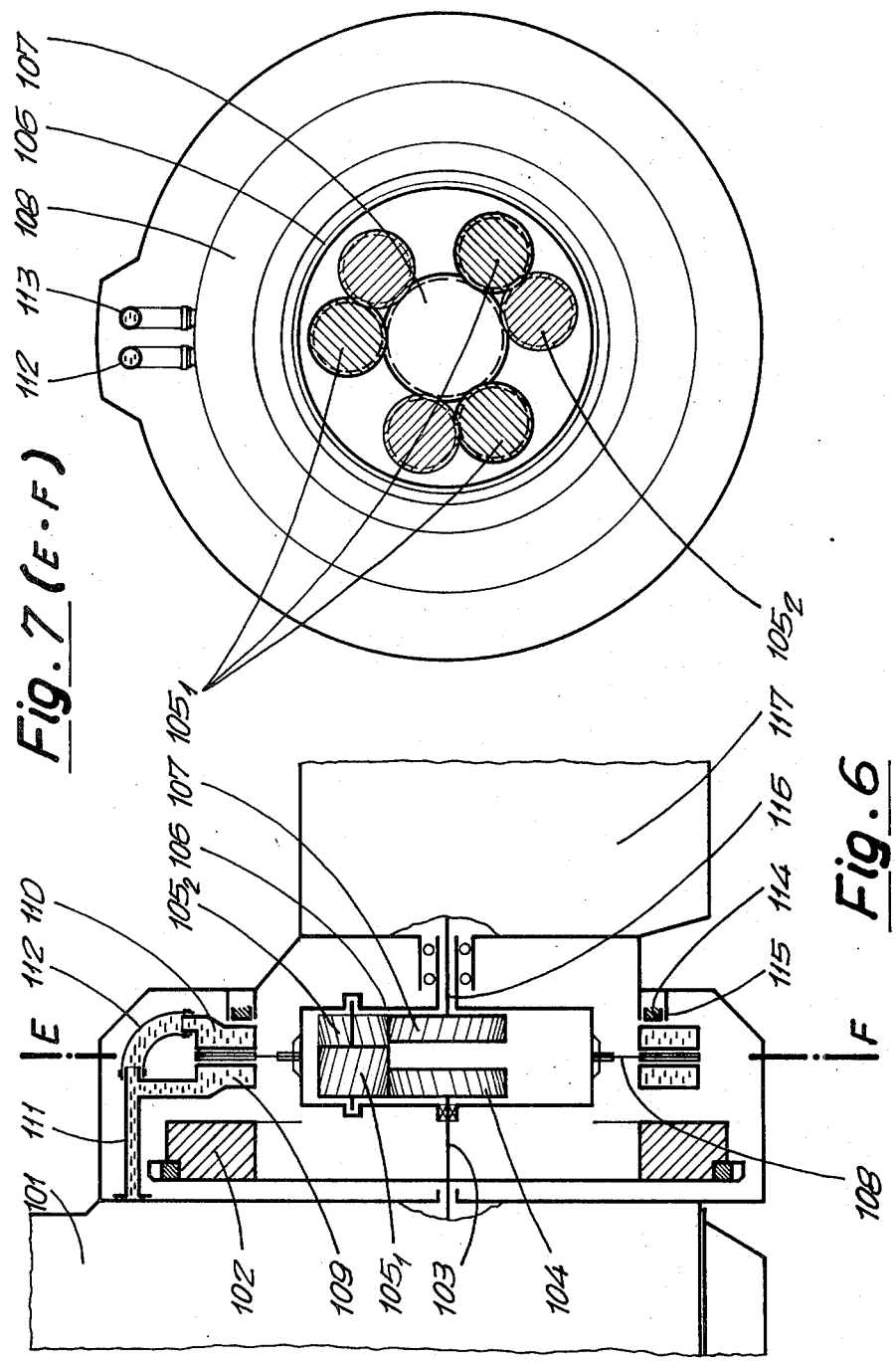

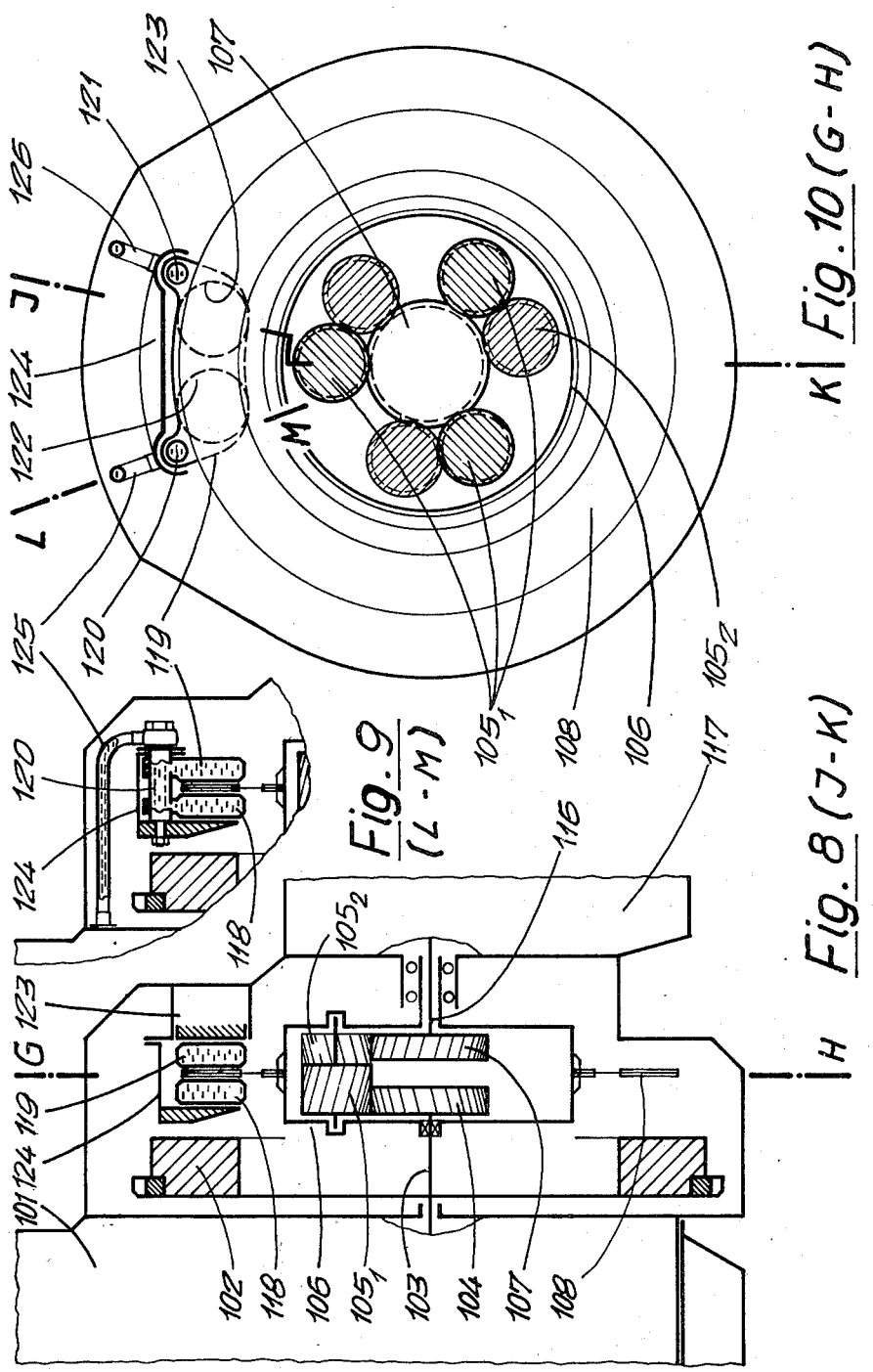

STARTING DEVICE FOR HEAVY VEHICLES

This application is a continuation-in-part of my copending application Ser. No. 202,773, filed Nov. 29, 1971, now abandoned.

BACKGROUND OF INVENTION

Heavy vehicles require multi-stage transmission assemblies which are equipped with starting friction clutches and means for interrupting the power transmission when speed ratios are changed. In order to increase speed it was necessary in recent years to enhance the specific performance for such vehicles so that the load on the friction clutches in use, particularly in starting on upward gradients, was at the limit so that the friction discs carrying the linings had to be replaced after comparatively short runs. The replacement of friction clutches by hydrodynamic devices causes a loss of efficiency. In addition, this involves the disadvantage of steady additional heat generation in the transmission housing. This is why it has been endeavoured to equip starting clutches for heavy vehicles with liquid cooling. However, since both components to be coupled rotate, there is the difficult task of providing a rotating supply of coolant.

Again, transmission assemblies of the type designated as powershift or clutch transmission assemblies equipped with common hydraulically actuated clutches which are engaged and disengaged respectively to change the speed ratios, require a starting clutch irrespective of whether it is a countershaft or planetary transmission. An additional difficulty in shifting clutch transmission assemblies of this type resides in the fact that, after disengaging one clutch, the clutch of the next speed ratio must engage as promptly as possible so that the slipping of the clutch does not cause too much heat and too much abrasion on the friction linings. In addition, the power transmission must be interrupted as little as possible on the one hand while no shock must be caused during shifting on the other. The shifting process thus constitutes a compromise of which the optimum is difficult to achieve by controlling the pressure in the hydraulic system so that shifting shocks frequently occur when speed ratios are shifted in such clutch transmission.

The present invention has for its object to provide a novel device for starting which is free from the above disadvantages and replaces presently know starting clutches between the engine and the transmission assembly. The invention is furthermore disigned to provide an actuating system which not only controls the starting unit but also avoids the above-mentioned shifting shocks.

The objects of this invention will become apparent by the following description of some embodiments with reference to the enclosed drawings, in which:

FIG. 4 is a view of a vertical section through a tenspeed transmission assembly employing another embodiment of a starting device at the transmission output;

FIG. 5 is a view of a cross-section taken along line A—B of FIG. 4;

FIG. 6 is a view of a vertical section through a starting device arranged at the transmission input;

FIG. 7 is a view of a cross-section taken along line E-F of FIG. 6;

FIG. 8 is a view of a vertical section through a starting device similar to that shown in FIG. 6 but equipped with a different braking apparatus, taken along line J-K of FIG. 10;

FIG. 9 is a view of a fragmental section, taken along line L-M of FIG. 10;

FIG. 10 is a view of a cross-section taken along line G-H of FIG. 8;

The transmission assemblies shown in FIGS. 1, 2, 4, 5 and 12 are so-called constant mesh countershaft transmissions in which the gears are carried on parallel shafts and are in constant mesh. Arranged between the gear wheels are friction members, particularly rotating friction clutches, the actuation of which enables the various speed ratios to be shifted.

Figure 1:
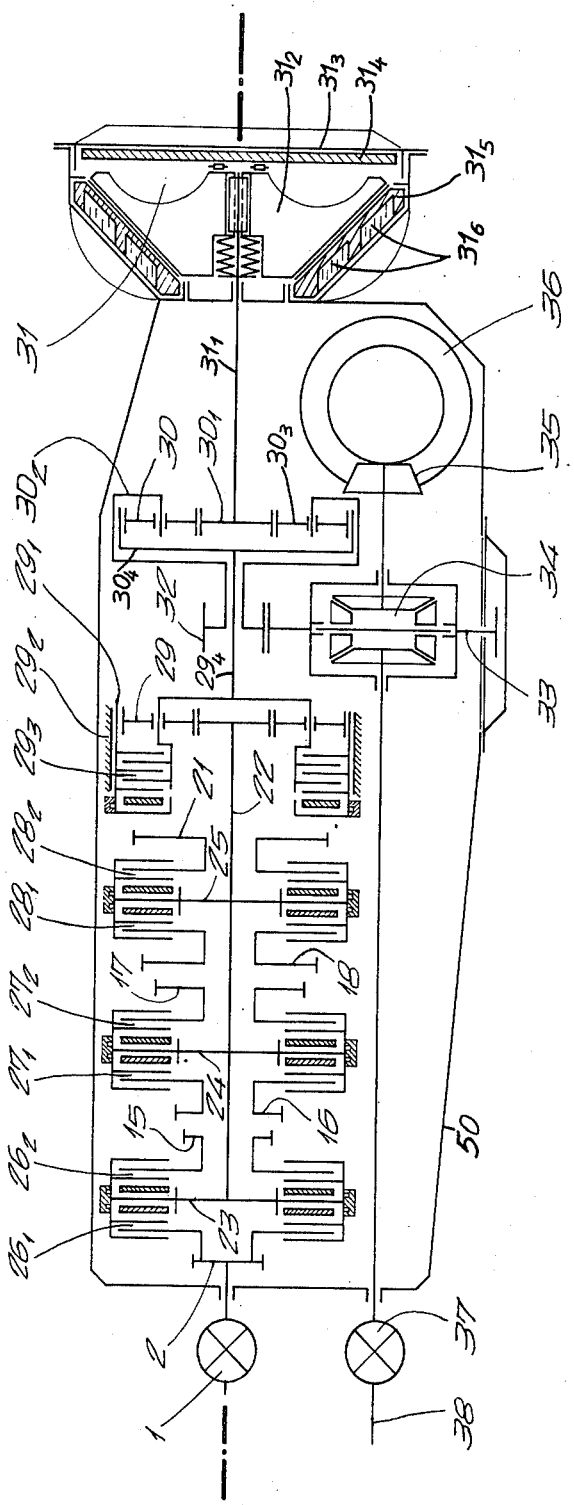
FIG. 1 is a schematic view of a vertical section through a tenspeed transmission assembly for a heavy motor vehicle with four driven wheels and a starting device arranged at the transmission output.
Figure 2:
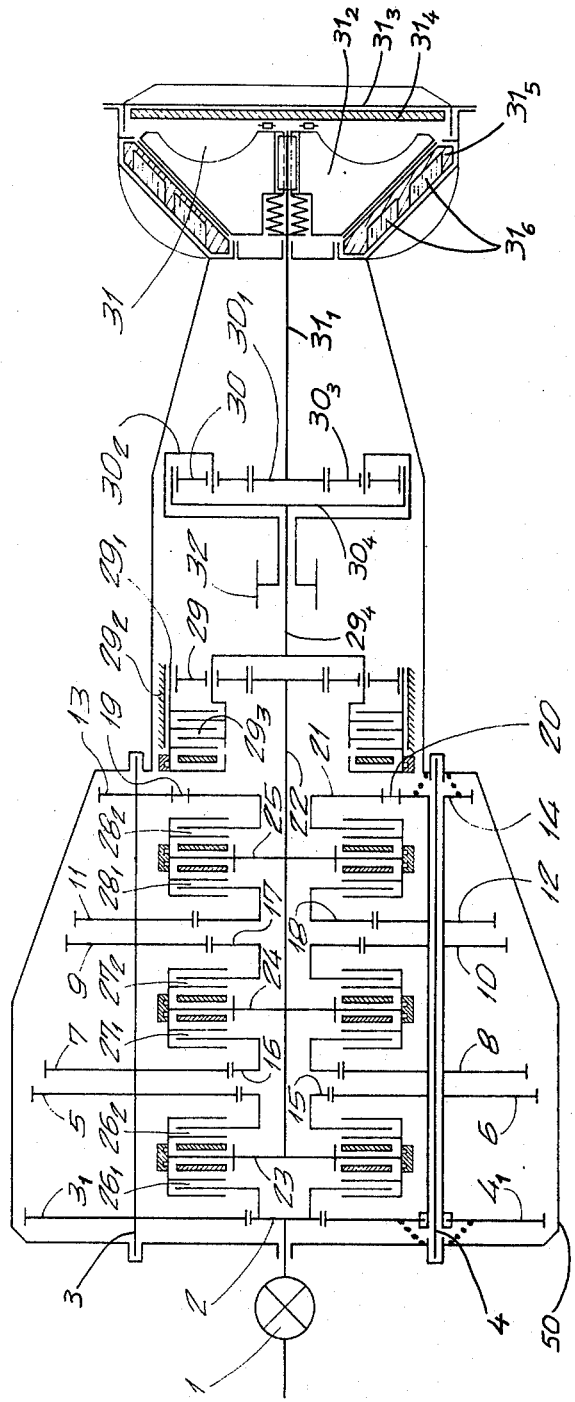
FIG. 2 is a schematic view of a horizontal cross-section through the transmission assembly of FIG. 1.
Figure 3:
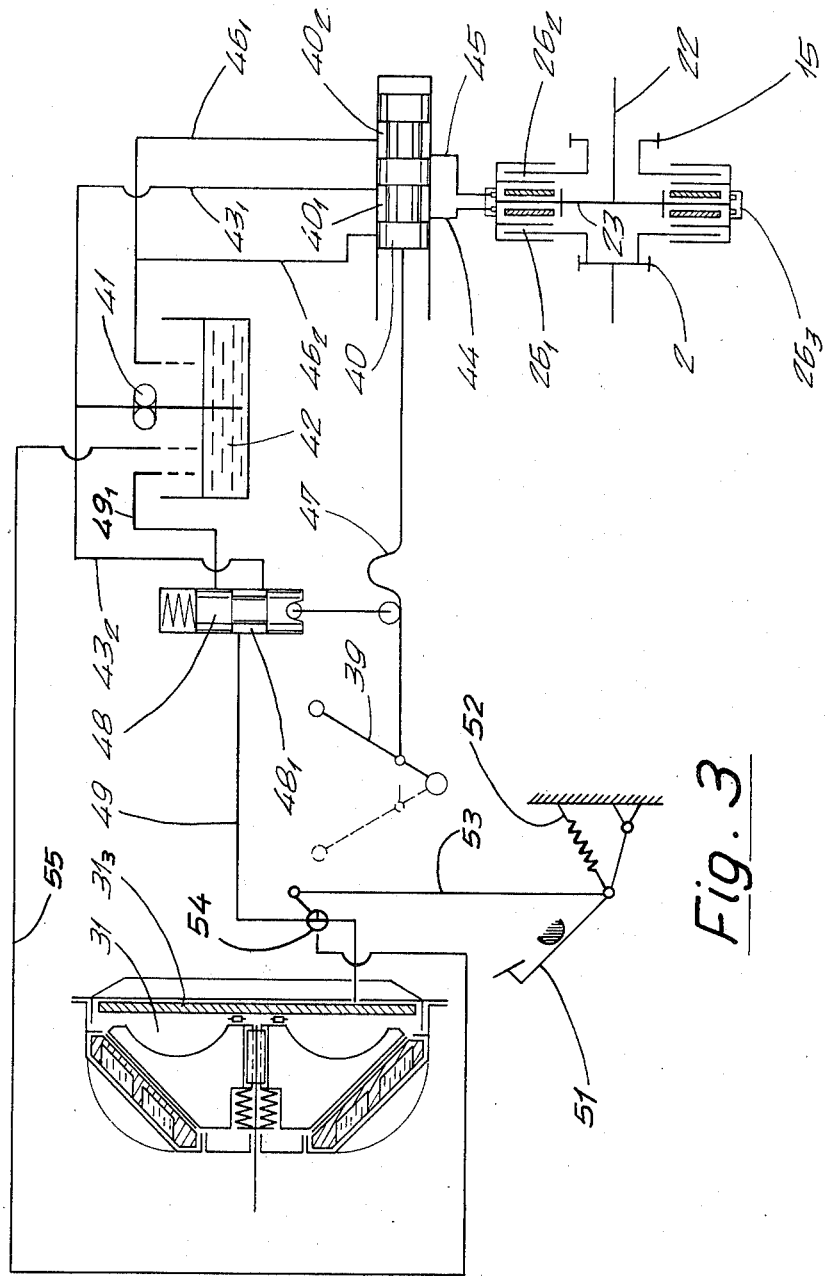
FIG. 3 is a schematic view of an embodiment of a actuation system for two speed ratios of the transmission assembly according to FIG. 1.

In the embodiment shown in FIGS. 1 to 3 the reference numeral 2 designates the input gear wheel of the transmission assembly which is directly driven by the engine via the cardan joint 1 no starting clutch or torque converter being provided between the engine and the transmission. The transmission is a combination known per se of a clutch transmission assembly with a planetary gear arranged behind the transmission. The input gear wheel 2 meshes with the wheels $3_1$ and $4_1$ of the two countershafts 3 and 4 which are equipped with further gear wheels 5 through 14 (FIG. 2). The wheels 5 and 6 mesh with the wheel 15, the wheels 7 and 8 with the wheel 16, the wheels 9 and 10 with the wheel 17, the wheels 11 and 12 with the wheel 18 and the wheels 13 and 14 with the gear wheel 21 of the main shaft 22 via reversing gear wheels 19, 20. Connected with the main shaft 22 are the clutch carriers 23, 24, 25 of the double shifting clutches $26_1/26_2/27_1/27_2/28_1/28_2$. The gear wheels and shifting clutches provide a total of five forward and one reverse speeds. In order to double the number of speed ratios a plantary gear unit 29 is provided of which the ring gear $29_1$ is arrested at the first five forward speeds by the brake $29_2$ and short-cut by a clutch $29_3$ at the five higher speeds.

The starting unit in this embodiment consists of the combination of a further planetary gear 30 with a water-cooled friction brake 31. The starting unit enables power transmission from the transmission output shaft $29_4$ to the wheels to be discretionally engaged or disengaged. The planetary gear 30 together with the transmission is located in the oil-filled transmission housing 50 while the dry-running friction brake 31, which may be designed as a conical brake, is attached to the housing 50. The operation of the starting unit will appear from its description below. The output shaft $29_4$ of the transmission drives the ring gear $30_4$ which rotates via the planetary gears $30_3$, the planet carrier $30_2$ if the sun gear $30_1$ is locked. In this embodiment the transmission assembly is designed for a truck with four driven wheels which is why the carrier $30_2$ is formed with a pinion 32 which drives a driving gear 33 of a distributer differential gear 34. Two of the driven vehicle wheels are driven via the pair of bevel gears 35, 36 and the other pair of wheels via the cardan joint 37 by the driving shaft 38. The starting unit could naturally be incorporated in other vehicles as well. The sun gear $30_1$ is connected to the shaft $31_1$ on which shaft is mounted the lined brake shoes $31_2$ of the conical brake 31 for axial movement therealong. The conical brake known per se comprises the pressure chamber $31_3$, the pressure plate $31_4$ and the conical brake ring $31_5$. Power transmission between the output shaft $29_4$ and the gear 33 obtains only when the brake is applied, i.e. when oil is admitted to the pressure chamber $31_3$ and the brake shoes $31_2$ rest against the brake ring $31_5$ so that the sun gear $30_1$ is locked by the shaft $31_1$.

The starting unit enables the vehicle to be started at all speeds. An actuating system described in detail below is provided for the purpose of causing, in a first mode of actuation, a slipping braking action of the shoe $31_2$ on the brake ring $31_5$. In order to dissipate the heat generated in this braking process, the brake rings are preferably water-cooled. For this purpose concentric cooling ducts $31_6$ through which water flows are provided. Cooling of brakes by water is explained in detail in my co-pending continuation-in-part application Ser. No. 340,959 filed Mar. 14, 1973. The conical brake could also be replaced by some other brake which operates with a dry frictional connection, by way of example, a disc brake of the usual design. It is best for all applicable brakes that they are water-cooled, which the present art has proved to be the best provision for dissipating the thermal energy created by the starting process. Consequently, the brakes of the starting units of the further embodiments described later are water-cooled as well. However, this is not designed to be a limitation, and if it proves to be favourable the heat generated in the brake of the starting unit in this and other embodiments may also be dissipated in some other manner, such as by forced-draft air cooling.

FIG. 3 illustrates an embodiment of an actuating system in which a starting pedal 51 is provided for starting. The pressure chamber $31_3$ is connected, via the oil supply line 49, with the oil sump 42 and is under pressure when the vehicle is in driving operation: the starting pedal 51 thus remains in the position indicated. Actuation of the pedal 51 against the action of the spring 52 enables a three-way valve 54 to be so rotated via the linkage 53 that the pressure in the chamber $31_3$ of the starting brake may be released via the line 55. The transmission is thus disconnected from the driven vehicle wheels for the reason above outlined. Starting is effected by allowing the pedal to return, providing a sliding braking of the brake shoes $31_2$ on the brake ring $31_5$. The valve 54 may also be actuated by a speed regulator in the known manner in order to enable starting to be effected without a pedal in dependence on the engine speed.

The actuating system for the starting unit and the transmission clutches further enables the suppression of the mentioned shifting shocks. The actuating system operates in such a manner that it briefly releases the brake 31 (which is engaged in normal road operation) when a transmission clutch is disengaged and the clutch of the next speed is engaged. This measure makes it possible promptly to disengage and engage the clutches because the shifting shock is suppressed by the brake 31 alone which is suitable, by its dimensions and cooling, for absorbing the shocks that occur when speeds are changed and for dissipating the thermal energy then generated.

In FIG. 3 the actuating system is explained in detail with reference to the transmission clutches $26_1$ and $26_2$ for the fourth and fifth speeds. Correspondingly the change-over from ninth to tenth speed is effected while the brake $29_2$ is disengaged. The changespeed lever 39 is connected with the control valve 40 which, in the position shown, holds the clutch $26_1$ under pressure so that the fifth or tenth speed is engaged. The oil pump 41 sucks oil from the sump 42 and supplies it, via the pressure line $43_1$ and the control valve recess $40_1$, to a supply line 44 associated with the transmission clutch $26_1$. Thence the pressure oil passes into the pressure chamber of the clutch $26_1$ through the admission ring $26_3$. The engaged clutch $26_1$ connects the driving gear 2 with the main shaft 22. The transmission clutch $26_2$ is open because the supply line 45 is connected, via the recess $40_2$ of the control valve, with the return line $46_1$ and thus with the oil sump 42.

Movement of the change-speeed lever 39 into the position shown in broken lines, causes the 4th or 9th speed to be engaged because the clutch $26_1$ is connected, by the connection with the supply line 44 via the recess $40_1$ of the control valve, with the return line $46_2$ and the oil sump, and thus becomes pressureless, while the clutch $26_2$ is under pump pressure through the supply line 45, the recess $40_2$ and the pressure line $43_1$. Sumultaneously with the disengagement of the clutch $26_1$ and the actuation of the clutch $26_2$ a further control valve 48 is so displaced by the cam 47 in the linkage between the change-speed lever 39 and the control valve 40 that its recess $48_1$ connects the pressure chamber $31_3$, which is normally under pressure and supplied with pressure oil through the line $43_2$ and the supply line 49, by the oil pump, of the water-cooled brake 31 with the oil sump via the return line $49_1$. The brake 31 is thereby briefly disengaged and absorbs the shock that occurs as the clutches $26_1$ and $26_2$ are shifted.

The brief hydraulic actuation of the brake 31 which is mechanically controlled by a cam can be replaced by any other suitable control device. By way of example hydraulic control by means of electrically actuated valves is possible, the control characteristic being so selected that the shifting shocks are suppressed as completely as possible. Again, hydraulically operating control devices may be employed.

FIGS. 4 and 5 illustrate an embodiment in which a three-component planetary gear is arranged behind a five-speed countershaft transmission in the known manner. As distinguished from the embodiment shown in FIGS. 1 to 3, no separate planetary gear is provided for the starting unit. Rather, the brake of the said starting unit, referred to below as starting brake, is connected with a component of the planetary gear. One consequence is that starting is possible only at one of the first five speeds, i.e. only if the planetary gear reduces the speeds. At the speeds six to ten the planetary gear and thus the starting brake are short-cut. The crankshaft 61 of the engine with the flywheel 62 drives, via an elastic suspension arrangement 63, the driving wheel 64 of the countershaft clutch transmission assembly and thence the three countershafts 65, 66, 67 located in the transmission housing 85 with the associated countershaft wheels $65_1$, $65_2$, $65_3$, $65_4$, $65_5$, $65_6$, $66_1$, $66_2$, $66_3$, $66_4$, $66_5$, $66_6$ and the wheels $67_1$, $67_2$, $67_3$, $67_4$, $67_5$, $67_6$ (not visible in FIG. 4). The drive of the shaft 68 is effected via the gear wheels $68_1$, $68_2$, $68_3$, $68_4$ and $68_5$. Arranged between the countershaft wheels $65_6$, $66_6$ and $67_6$ and the wheel $68_5$ of the main shaft 68 are the reversing gears $68_6$ for the actuation of the reverse drive. Located on the main shaft 68 between the driving wheel 64 and the gear wheel $68_1$, the wheels $68_2$ and $68_3$ and the wheels $68_4$ and $68_5$ are hydraulically operated twin clutches 69, 70 and 71. When engaged, the clutches connect the adjacent gear wheel with the main shaft 68. The pressure oil for the clutches is supplied and drained by oil guide rings $69_1$, $70_1$ and $71_1$ fixed in the circumferential direction and sliding on the clutch housings. A detailed description of such clutches is in my co-pending patent application Ser. No. 331,696 filed Feb. 12, 1973. Connected with the main transmission shaft 68 is the sun gear 72 of the planetary gear which is centred only on the teeth of the planetary gears 73 of the group transmission just as the wheels of the main transmission shaft rest on the teeth of the associated countershaft wheels. The ring gear 74 of the planetary gear carries the friction laminations 75. These friction laminations 75 are disengaged at the speeds 1 to 5 so that the planetary gear reduces the speed of revolutions of the main transmission shaft 68 transmitted to the output shaft 79. At the speeds 6 to 10 the laminations 75 are arrested, the planetary gear is short cut and the shafts 68 and 79 rotate at the same speed. The starting unit consists of a brake lamination 76 provided with brake linings on both sides which is axially movably located on a spline profile of a sleeve-type extension $74_1$ of the ring gear 74 for rotation therewith. Facing the brake linings are two water-cooled brake rings 81 and 82 of which the brake ring 82 is rigidly mounted in the housing portion $85_1$ while the brake ring 81 is rotatably supported on a spreading device 77 of known design which is supported in the housing portion $85_2$. Power transmission from the main transmission shaft 68 to the output shaft 79 occurs at low speeds 1 to 5 only when the ring gear 74 is stationary, i.e. the brake lamination 76 is held stationary between the brake rings 81 and 82 during road operation. In idle condition the starting brake is released. For starting, the brake lamination 76 is slidingly braked between the brake rings by means of rotation of the brake ring 81. The brake rings 81 and 82 are provided with concentric cooling ducts $81_1$ and $82_1$ through which water flows. As regards the precise design of such water-cooled brakes reference is made to the above-mentioned continuation-in-part application. In general, the brake and its cooling system are so dimensioned that the braking heat generated is dissipated. Take-off is via the planet carrier 78, the output shaft 79 with the driving flange 80 to the cardan shaft $80_1$. For the purpose of braking the vehicle a transmission brake is provided comprising a brake lamination 85, arranged on the output flange 80 in the transmissing housing which rotates between water-cooled brake rings 83, 84 and is actuated by a ball spreading device 86.

FIGS. 6, 7 and 8 to 10 illustrate two embodiments of starting units employing a combination of a planetary gear and a disc brake and which may replace the starting clutches or hydrodynamic converters so far employed. In these embodiments the starting units are located at the input of the transmission assembly but they may be located at the output if desirable. The two embodiments differ only in respect of their braking means so that the samee reference numerals are used for similar components.

In FIGS. 6 to 10 the engine is designated at 101 and the flywheel at 102. The driven output shaft 103 from the engine 101 drives the input sun gear 104 of the starting unit which, when idling, drives the planetary gears $105_1$ and $105_2$ which rest on the stationary output sun gear 107. In idle condition the planet carrier 106 in which the planetary wheels $105_1$ and $105_2$ are rotatably supported rotates together with the lamination 108 of the starting brake. In the embodiment according to FIGS. 6 and 7, for starting operation the axially movable annular brake ring 110 through which water flows is forced against the friction surface of the lamination 108, the latter resting on the opposite side on the annular brake ring 109 through which water flows as well. The axial motion of the ring 110 is caused by the hydraulically, pneumatically or mechanically actuated pressure ring 114 in the ring cylinder 115. In the braking process the planet-carrier 106 is arrested and the driving moment of the engine is transmitted, via the input sun gear 104, the planetary gears $105_1$ and $105_2$, to the output sun gear 107 and thence into the transmission assembly 117 via the output shaft 116. The cooling water of the engine is supplied to the brake via the line 111 and, via the flexible lines 112 and 113, to the axially movable suspended brake ring 110.

Figure 11:
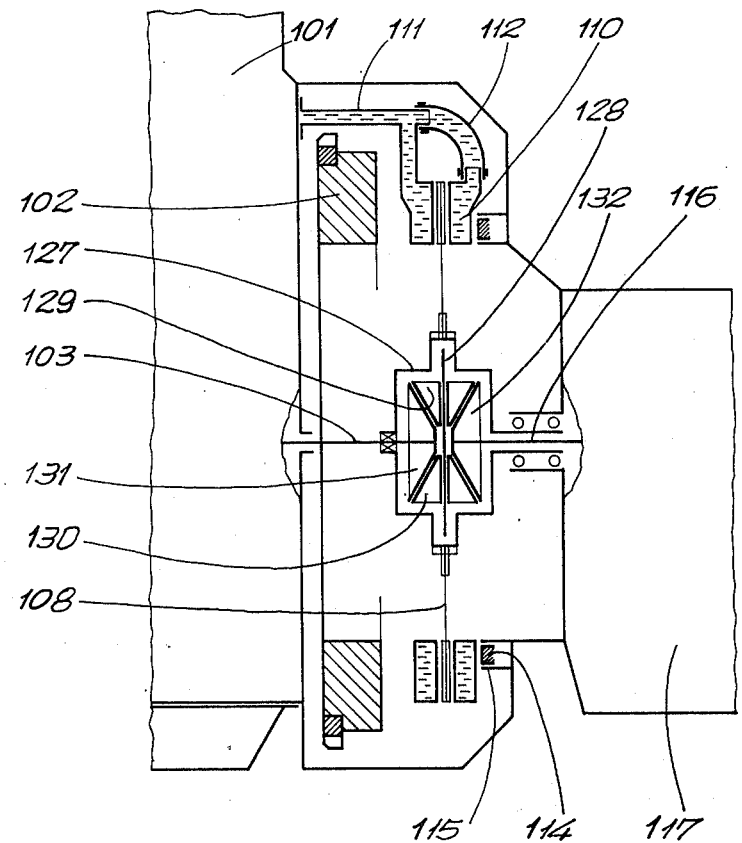
FIG. 11 is a view of a vertical section through a further embodiment of a starting device.

In the operation of the embodiment according to FIGS. 8 through 10 the lamination 108 is held by the shoes 118 and 119 through which water flows. The said shoes are designed as partial rings. The shoe 118 rests on the support 124 while the axially mobile shoe 119 is hydraulically or pneumatically applied by the pistons 122 and 123 guided in cylinders. The cooling water is supplied by the line 125 and passed into the two shoes 118 and 119 by the tube 120 which is firmly attached to the support 124 and here also serves for torque transmission, and drained therefrom by the similarly attached tube 121 and via the line 126. In road operation the lamination 108 is arrested between the brake shoes in both embodiments. It is obvious that an actuating system could also be provided for this starting unit which would suppress the shifting shocks for this starting transmission assembly by briefly releasing the brake lamination 108 during the change of speed. The present starting unit enables the high starting outputs to be transmitted also in the presence of stronger driving engines without substantial wear of the brake lamination 108, and if the brake is adequately dimensioned, the shifting shocks can be absorbed by friction. The starting unit shown in FIG. 11 differs from the embodiment according to FIGS. 6 and 7 by a planetary gear which is equipped with bevel planetary gears. The engine is designated at 101, the flywheel at 102. The driving shaft 103 extending from the engine 101 drives the bevel sun gear 131 of the starting unit which rotates, together with the bevel planetary gears 129, 130 and the output bevel sun gear 132, with the planetary carrier housing 127 when in idling condition. For starting, the axially mobile brake ring 110, through which water flows, is forced against the friction surface of the disc 108 the opposite side of which rests on the brake ring 109 through which water passes as well. The axial motion of the ring 110 is effected by the hydraulically, pneumatically or mechanically moved pressure ring 114 in the ring cylinder 115. The braking operation causes the member 127 to be arrested and the driving torque of the engine to be transmitted, via the bevel sun gear 131, the bevel planetary gears 129 and 130 located on the transverse shafts 128, via the output bevel sun gear 132 and thence the output shaft 116, to the transmission assembly 117. The cooling water of the engine is supplied to the brake through the line 111 to the brake and, via the flexible line 112, to the axially mobile suspended brake ring 110. The heated cooling water is removed in the same manner. This starting unit could naturally also be arranged at the output of the transmission assembly.

Figure 12:
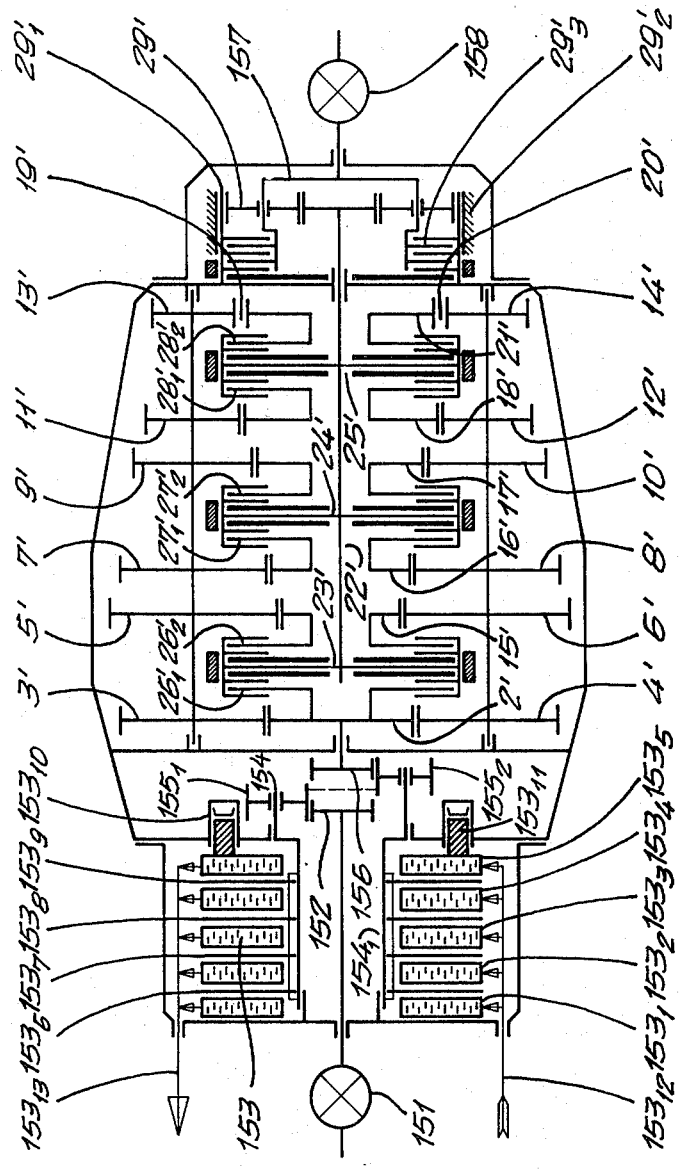
FIG. 12 is a view of a vertical section through a tenspeed transmission assembly with a starting device arranged at the transmission input.

In the embodiment according to FIG. 12 the transmission shown in FIGS. 1 to 3 is provided with a starting unit arranged not at the rear end but at the input end. In order to avoid repetitions, a description of the components 2' through 29' is dispensed with since they are identical with the components 2 through 29 of the embodiment according to FIGS. 1 through 3. The starting unit provided for starting and to suppress shifting shocks is driven by the engine via the cardan joint 151. The planetary gear comprises the input sun gear 152 which drives, while the planet carrier 154 is arrested by the liquid-cooled disc brake 153, the output sun gear 156 via the planetary gears $155_1$ and $155_2$. Power take-off from the planet-carrier 157 of the planetary gear 29' is via the cardan joint 158. The starting brake 153 consists of the brake rings $153_1$ through $153_5$ which are hollow, stationary in the circumferential direction, internally water-cooled and preferably made of copper, and between which the laminations $153_6$ to $153_9$ provided with friction linings and located on the planet carrier 154, rotate. For starting, the oil pressure in the ring cylinder $153_{10}$ is increased and the ring piston $153_{11}$ axially moved thereby so that the package comprising the braking rings $153_1$ to $153_5$ with the discs $153_6$ to $153_9$ is closed. The cooling water is supplied to the brake rings $153_1$ to $153_5$ via the line $153_{12}$ and draind through the line $153_{13}$.

I claim:
1. A vehicle comprising:
an engine comprising an engine-output shaft,
a transmission shiftable in steps by means of friction clutches and having an input shaft operatively connected to the engine-output shaft and an output shaft operatively connected to the driven wheels of the vehicle, the driving connections from the engine to the transmission and to the driven wheels defining a power transmission path,
a starting unit in said power transmission path comprising a planetary gear having at least three components, a first component, a third component located downstream from the first component, a third component located downstream from the first component in the power transmission path and a second component operatively engaged with at least one of the first and third components to effect drive between said first and third components,
a braking device having at least one braking member connected with saiad second component so as to either rotate therewith or hold it against rotation relative to a stationary structure, said braking member including at least one brake lamination and including brake rings with braking surfaces facing said brake lamination for the purpose of braking it, actuating means for actuating the braking device and coolant means for passing liquid coolant to the sides of the brake rings opposite from said braking surfaces so as to liquid cool the braking device,
and an actuating system for controlling operation of said braking device, said actuating system having means for providing a first mode of operation for holding the brake member fixed relative to the stationary structure so that power can be transmitted between said first and third components, and a second mode of operation for releasing the brake member relative to the stationary structure, and said actuating system including means for holding the brake lamination in sliding engagement with the braking surfaces of the brake rings during movement from the second mode to said first mode so as to suppress shocks produced during starting of the vehicle and shifting of the transmission,
said braking device being a hydraulically actuated brake having a pressure chamber and said brake laminations being movable axially under the pressure of fluid in the pressure chamber to engage the brake ring by means of pressure fluid in the pressure chamber, said actuating system comprising a hydraulic pressure line connected to said pressure chamber and maintaining a pressure therein during the first mode of operation so that the brake laminations are applied to the brake ring providing driving engagement between the first and third components to drive the wheel, said actuating system further comprising a pedal and a valve in said pressure line, which valve blocks the pressure line when the pedal is in operating position for said second mode of operation, relieving the pressure chamber so that the brake is released, and providing during the return movement of the pedal into inoperative position for starting operation the pressure chamber with increasing oil pressure via said valve providing said sliding braking of said brake laminations on said brake ring, and said actuating system further comprising a control means in said line and a lever with various positions corresponding to the speed ratios, the said control means being operable to briefly reduce the pressure in the pressure chamber during said first mode of operation when the lever is moved between the said two positions so that the brake is briefly released suppressing the shifting shocks.

2. A vehicle according to claim 1 wherein said first component is connected with said transmission output shaft and said unit is arranged in the path of power transmission between said transmission and said driven wheels.

3. A vehicle according to claim 1, wherein said first component is connected with said engine output shaft and said third of said components is connected with the transmission input shaft.

4. A vehicle according to claim 1, wherein said planetary gear and said transmission are accommodated in a common oil filled transmission box.

5. A vehicle according to claim 1 said starting unit being arranged between the engine and the transmission, said first component of said planetary gear being connected with the engine output shaft and said third component being connected with the transmission input shaft, the planetary gear being arranged in the central opening of the annulus.

6. A vehicle according to claim 1, said first component of the said planetary gear being a ring gear, said second component being a sun gear drivingly connected to a shaft and the third component comprising planet gears interconnecting the said ring and sun gears and including a planet carrier operatively connected to the power transmission path downstream from the said planetary gear.

7. A vehicle comprising, an engine having an engine-output shaft, a transmission shiftable in steps by means of friction clutches and having an input shaft and a planetary gear with several components of which a first component is driven by the transmission, a third component is operatively connected with the transmission output shaft and a second component is operatively engaged with at least one of the first and third components to effect drive between the first and third components, a starting unit including a braking device having at least one braking member connected with said second components so as to either rotate therewith or hold it against rotation relative to a stationary structure, said braking member including at least one brake lamination and including brake rings with braking surfaces facing said brake lamination for the purpose of braking it, actuating means for actuating the braking device and coolant means for passing liquid coolant to the sides of the brake rings opposite from said braking surfaces so as to liquid cool the braking device, and an actuating system for said friction clutches and said starting unit having a first position having means for selectively releasing said clutches and engaging the braking device to a stationary structural member so that the speed of said first component is reduced and transmitted to the said output shaft, and which actuating system in this first position additionally includes means to enable the brake lamination to be slippingly braked for starting at any speed selected in said first position without requiring the provision of a starting clutch betwen the engine and the transmission, and which actuating system in a second position includes means for selectively engaging said friction clutches to lock said second component with said output shaft so that said first component and said output shaft rotate at the same speed.

8. A vehicle according to claim 7
said first component being a sun gear driven by a main transmission shaft, said second component being the ring gear, said ring gear being rotatably journalled in the transmission housing with a sleeve-type extension embracing the output shaft, said brake lamination being axially movably located on said extension, said brake rings being provided with concentric ducts for the liquid coolant and one of said brake rings being axially displaceable by means of a spreading device.

9. A vehicle according to claim 7 wherein a second brake lamination is arranged axially movably on said output shaft in order to brake the latter, said second lamination being arranged between brake rings which are also water-cooled, and said brake lamination being capable of being actuated independently of the said actuating system.

* * * * *